US007005485B2

(12) United States Patent
Burns et al.

(10) Patent No.: US 7,005,485 B2
(45) Date of Patent: Feb. 28, 2006

(54) PROCESS FOR PRODUCING POLYOLEFINS

(75) Inventors: David H. Burns, Houston, TX (US); Donald W. Verser, Houston, TX (US); John D Hottovy, Bartlesville, OR (US); Michael C. Carter, Humble, TX (US); Robert W. Bohmer, Kingwood, TX (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 0 days.

(21) Appl. No.: 10/716,201

(22) Filed: Nov. 18, 2003

(65) Prior Publication Data

US 2004/0151642 A1 Aug. 5, 2004

Related U.S. Application Data

(63) Continuation-in-part of application No. 09/923,751, filed on Aug. 7, 2001, which is a continuation-in-part of application No. 09/213,147, filed on Dec. 18, 1998, now abandoned.

(51) Int. Cl.
*C08F 2/38* (2006.01)

(52) U.S. Cl. ........................ 526/82; 526/64; 526/84; 526/90; 526/348; 526/352

(58) Field of Classification Search ................ 526/82, 526/348, 352, 64, 84, 90
See application file for complete search history.

(56) References Cited

U.S. PATENT DOCUMENTS

| | | | | |
|---|---|---|---|---|
| 3,152,872 A | | 10/1964 | Scoggin et al. | 34/15 |
| 3,817,962 A | | 6/1974 | Smith et al. | 260/88.2 |
| 3,998,995 A | | 12/1976 | Buss et al. | 526/59 |
| 4,121,029 A | | 10/1978 | Irvin et al. | 526/64 |
| 4,151,122 A | | 4/1979 | McDaniel et al. | 252/458 |
| 4,182,810 A | | 1/1980 | Willcox | 526/64 |
| 4,276,191 A | | 6/1981 | Karayannis et al. | 252/429 |
| 4,296,001 A | | 10/1981 | Hawley | 252/458 |
| 4,345,055 A | | 8/1982 | Hawley | 526/96 |
| 4,364,842 A | | 12/1982 | McDaniel et al. | 252/430 |
| 4,402,864 A | | 9/1983 | McDaniel | 252/430 |
| 4,424,341 A | | 1/1984 | Hanson et al. | 528/501 |
| 4,501,885 A | | 2/1985 | Sherk et al. | 528/501 |
| 4,613,484 A | | 9/1986 | Ayres et al. | 422/132 |
| 4,958,006 A | | 9/1990 | Bernier et al. | 528/501 |
| 5,183,866 A | | 2/1993 | Hottovy | 526/88 |
| 5,200,502 A | | 4/1993 | Kao et al. | 528/494 |
| 5,207,929 A | | 5/1993 | Sung et al. | 210/774 |
| 5,237,025 A | | 8/1993 | Benham et al. | 526/114 |
| 5,387,659 A | | 2/1995 | Hottovy et al. | 526/59 |
| 5,442,019 A | * | 8/1995 | Agapiou et al. | 526/82 |
| 5,731,381 A | | 3/1998 | Apecetche et al. | 526/83 |

* cited by examiner

*Primary Examiner*—William K. Cheung
(74) *Attorney, Agent, or Firm*—Williams, Morgan & Amerson, P.C.

(57) ABSTRACT

A process is provided that produces polyolefins. The process comprises mixing a first stream, which comprises at least one catalyst deactivating agent, with a second stream, which comprises at least one polyolefin, at least one catalyst, at least one diluent, and at least one monomer, to produce a third stream, which comprises at least one polyolefin, at least one deactivated catalyst, at least one diluent, and at least one monomer. By utilizing the deactivating agent, polymerization can be slowed, or substantially stopped, when downstream equipment is being repaired or process control problems are being corrected. Later, polymerization can be restarted without the use of scavengers to remove poisons from the slurry polymerization reactor, and polyolefin production can be resumed.

4 Claims, 4 Drawing Sheets

PROCESS FOR PRODUCING POLYOLEFINS

This is a continuation-in-part of U.S. application Ser. No. 09/923,751, filed on Aug. 7, 2001, which is a continuation-in-part of U.S. application Ser. No. 09/213,147, filed on Dec. 18, 1998, now abandoned, both of which are incorporated here by reference.

FIELD OF INVENTION

This invention is related to the field of processes that produce polyolefins.

BACKGROUND OF THE INVENTION

Production of polyolefins is a large industry throughout the world producing billions of pounds of polyolefins each year. Improvements in these processes can save millions of dollars in production costs. Producers of polyolefins spend millions of dollars to research ways to decrease production costs. This is because of the vast economies of scale possible in these processes. That is, reducing production costs by a penny per pound can save large sums of money. For example, if all producers of polyolefins that comprised polymerized ethylene could reduce production costs by a penny per pound, this would produce a savings of about 800,000,000 dollars.

Currently, silos can be required in order to provide storage for polyolefins if downstream equipment, such as, for example, an extruder, is experiencing operational or process control problems. By utilizing silos, the production of polyolefins can continue while the downstream equipment is being repaired or process control problems are being corrected. Silos are also utilized to blend off-specification polyolefins with on-specification polyolefins to make a suitable polyolefin product. Silos and their associated equipment, such as, for example, a polyolefin transfer system, can require an extensive capital investment during construction. In addition, the maintenance and energy costs for these processes are also costly.

This invention provides a solution to minimize the capital, maintenance, and energy costs of polyolefin production by eliminating a need for silos and their associated equipment, or by reducing the costs associated with temporarily stopping or slowing polyolefin production.

SUMMARY OF INVENTION

It is an object of this invention to provide a process to produce at least one polyolefin.

It is another object of this invention to provide an apparatus to perform the process of producing at least one polyolefin.

In accordance with this invention, a process is provided comprising (or optionally, "consisting essentially of", or "consists of"):

(1) mixing Stream 1 with Stream 2 to produce Stream 3; wherein said mixing occurs in Mixing Zone One (100);

wherein Stream 1 comprises at least one catalyst deactivating agent;

wherein Stream 2 comprises a reaction mixture;

wherein said reaction mixture comprises at least one polyolefin, at least one catalyst, at least one diluent, and at least one monomer;

wherein Stream 3 comprises at least one polyolefin, at least one deactivated catalyst, at least one diluent, and at least one monomer;

(2) transporting at least a portion of Stream 3 from said Mixing Zone One (100) through Stream Zone 1 (200) and to Separating Zone One (300);

(3) separating Stream 3 in said Separating Zone One (300) into Stream 4 and Stream 5;

wherein said Stream 4 comprises a polyolefin lean stream wherein the majority of said Stream 4 comprises at least one diluent;

wherein said Stream 5 comprises a polyolefin rich stream wherein the majority of said Stream 5 comprises at least one polyolefin;

(4) transporting Stream 5 from said Separating Zone One (300) through a Stream Zone 3 (500) to an Agglomerating Zone One (600);

(5) agglomerating Stream 5 in said Agglomerating Zone One (600) to produce a Stream 6, wherein Stream 6 comprises at least one agglomerated polyolefin;

(6) transporting Stream 6 from said Agglomerating Zone One (600) through Stream Zone 4 (700) to a Product Recovery Zone (not depicted).

In accordance with this invention, an apparatus to perform the process of producing at least one polyolefin is provided.

One embodiment of the invention is a process that comprises: (1) introducing at least one monomer, at least one catalyst, and at least one diluent into an olefin polymerization zone under polymerization conditions, wherein the at least one monomer is polymerized to form at least one polyolefin, and wherein the olefin polymerization zone comprises a slurry polymerization reactor selected from a loop reactor and a stirred tank; (2) introducing a catalyst deactivating agent into the olefin polymerization zone for a selected time in an amount effective to substantially deactivate at least some of the at least one catalyst, whereby the polymerization of the at least one monomer is substantially stopped or the rate of polymerization is significantly slowed; and (3) restarting polymerization by introducing into the olefin polymerization zone at least one catalyst. The amount of catalyst deactivating agent can be selected so as to either temporarily kill the polymerization reaction or temporarily reduce its rate. In either case, restarting the polymerization can bring the rate of polymerization up to its desired level.

Another embodiment of the invention is an olefin polymerization apparatus that comprises: (1) a slurry polymerization reactor selected from a loop reactor and a stirred tank, wherein the reactor is suitable for polymerizing at least one monomer in the presence of at least one catalyst and at least one diluent to form at least one polyolefin, and wherein the reactor comprises at least one effluent removal conduit for removing an effluent that comprises at least one polyolefin; (2) a supply of catalyst deactivating agent operatively connected to the reactor so that catalyst deactivating agent can be introduced into the reactor at selected times and in selected quantities; (3) means for determining the quantity of catalyst in the reactor; (4) a separation zone operatively connected to the effluent removal conduit and capable of separating the effluent into a polyolefin lean stream and a polyolefin rich stream, wherein the separation zone comprises at least one polyolefin rich stream removal conduit; and (5) an agglomerating zone operatively connected to the polyolefin rich stream removal conduit and capable of agglomerating polyolefin from the polyolefin rich stream.

DETAILED DESCRIPTION OF INVENTION

Figure 1:
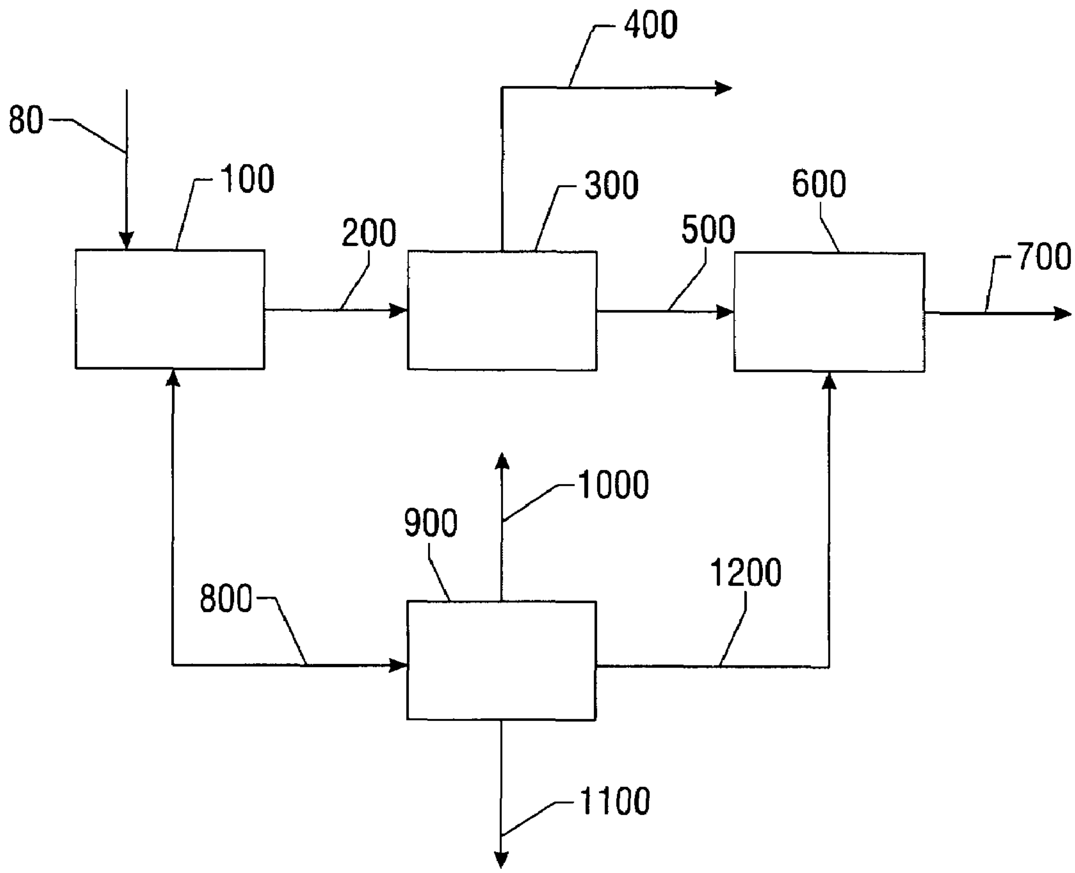
FIG. 1 discloses a diagram of one embodiment of this invention.

An embodiment of this invention, depicted in FIG. 1, comprises the following steps:

Step 1 is mixing Stream 1 (80) with Stream 2 to produce Stream 3 wherein said mixing occurs in Mixing Zone One (100). Stream 2 comprises a reaction mixture that includes at least one polyolefin, at least one catalyst, at least one diluent, and at least one monomer. In other words, Stream 2 can be a reaction mixture produced in a polymerization reactor, such as Mixing Zone One (100). Although not shown as separate streams in FIG. 1, it should be understood that this reaction mixture is typically produced by feeding monomer, catalyst, and diluent to the reactor, and polymerization in the reactor produces the polyolefin.

Generally, Stream 1 comprises at least one catalyst deactivating agent. Said deactivating agent can be any chemical compound capable of deactivating catalyst. Suitable deactivating agent include, but are not limited to, water, alcohols, and other oxygen-containing materials. Suitable alcohols include, but are not limited to, methanol, ethanol, and propanol. Suitable oxygen-containing materials include, but are not limited to, esters, ketones, aldehydes, and organic acids. Suitable examples of said oxygen-containing materials include, but are not limited to, ethyl acetate and acetic acid. Mixtures of one or more of the above materials can also be used. Preferably, said deactivating agent is water due to availability and ease of use.

Generally, the temperature and pressure of Stream 1 are such that Stream 1 remains in substantially a non-solid phase, or phases. Preferably, Stream 1 is at ambient temperature and atmospheric pressure since it is more economical.

Stream 1 can be introduced into said Mixing Zone One (100) by any means known in the art. For example, Stream 1 can be allowed to gravity flow or to be pressured into Mixing Zone One (100). Said deactivating agent may be introduced into Mixing Zone One (100) at a single location or multiple locations on said Mixing Zone One (100). Preferably, said deactivating agent is introduced in one location allowing a longer time for deactivation of said catalyst. When said catalyst is deactivated too quickly, less than approximately 5 minutes, the temperature in said Mixing Zone One (100) significantly decreases causing the pressure to decrease also. This can cause an upset in operating conditions in said Mixing Zone One (100).

The amount of deactivating agent employed depends on the type of catalyst system used. Optimally, the amount of deactivating agent is that which will substantially stop the polymerization reaction but not so much as to require the use of a scavenger, such as for example, diethyl zinc, to be utilized to remove catalyst poisons. In general, the amount of deactivating agent utilized ranges from about $10^{-12}$ moles of deactivating agent per mole of catalyst to about $10^3$ moles of deactivating agent per mole of catalyst. Preferably, about $10^{-6}$ moles of deactivating agent per mole of catalyst to about $10^2$ moles of deactivating agent per mole of catalyst are utilized. More preferably, the amount of deactivating agent utilized ranges from about $10^{-3}$ moles of deactivating agent per mole of catalyst to about 10 moles of deactivating agent per mole of catalyst. Most preferably, about 0.10 moles of deactivating agent per mole of catalyst to about 5 moles of deactivating agent per mole of catalyst are utilized. Catalyst usually comprises a very small amount of one or more catalytic metals, such as chromium, supported on a substrate, such as silica particles. "Mole of catalyst" as used herein refers to a mole of the catalytic metal or metals, and generally does not include the substrate. It should also be understood that the deactivating agent can be used to deactivate a cocatalyst such as triethyl aluminum (TEAl).

By utilizing said deactivating agent in this invention, polymerization can be slowed, or substantially stopped, when downstream equipment is being repaired or process control problems are being corrected. Then, polymerization can be restarted. The term "restarted" means to re-establish the polymerization reaction after the deactivating agent substantially deactivates the catalyst. Preferably, when polymerization is slowed or stopped by said deactivating agent, a portion of the polyolefin is circulated out of the slurry polymerization reactor prior to restarting polymerization. While the polyolefin is being circulated out of the slurry polymerization reactor, the pressure in the reactor is maintained by the addition of diluent or monomer or both. To restart the polymerization, catalyst is added to the slurry polymerization reactor. Preferably, polymerization is restarted in about 2 to about 6 hours, most preferably, in 2 to 4 hours. When repairs are complete, it is desirable to restart the reaction immediately. This invention allows for minimal time to restart polymerization since polymerization can be restarted without the use of scavengers to remove poisons from the slurry polymerization reactor.

The use of said deactivating agent provides a method to shut down polyolefin production, thus minimizing the amount of polyolefins produced that do not meet quality specifications. This process is superior to other methods of slowing or substantially stopping polyolefin production, such as decreasing or stopping catalyst feed to the slurry polymerization reactor. Decreasing catalyst feed causes production of larger amounts of polyolefins that do not meet quality specifications. Using this invention, the polymerization reaction in a slurry polymerization reactor can be slowed or substantially stopped by using said deactivating agent, and the melt index of the polyolefins produced can still meet product specifications.

By utilizing this invention, in some situations silos and their associated equipment can be eliminated from the polyolefin process. Therefore, Separating Zone One (300) comprising at least one flash chamber and said Agglomerating Zone One (600) comprising at least one extruder can be directly connected or "closed-coupled", rather than said polyolefin being transported to silos prior to agglomerating. For example, when utilizing the inventive, closed-coupled slurry polymerization process, if an extruder is not functional, the slurry polymerization reactor also must be shut down since no storage silos are available. However, when this invention is utilized, polyolefin production is minimized and the polyolefin quality is optimized. By eliminating these storage silos and related equipment, substantial cost savings can be obtained.

Stream 2 comprises a reaction mixture wherein said reaction mixture comprises at least one polyolefin, at least one catalyst, at least one diluent, and at least one monomer. The term "polyolefin", as used in this invention, includes homopolymers as well as copolymers of olefinic compounds. Usually, said polyolefin is a homopolymer consisting essentially of polymerized monomers having from 2 to about 10 carbon atoms per molecule or a copolymer comprising at least two different polymerized monomers having from 2 to about 16 carbon atoms per molecule. Exemplary monomers, that can be polymerized to produce homopolymers and copolymers with excellent properties, include, but are not limited to, ethylene, propylene, 1-butene, 1-pentene, 4-methyl-1-pentene, 1-hexene, 1-octene, and other higher olefins and conjugated or non-conjugated diolefins such as 1,3-butadiene, isoprene, piperylene, 2,3-dimethyl-1,3-butadiene, 1,4-pentadiene, 1,7-hexadiene, and other such diolefins and mixtures thereof. Preferably, said copolymers comprise polymerized ethylene and a polymerized higher alpha-olefin having from about 3 to about 16 carbon atoms per molecule. Propylene, 1-butene, 1-pentene, 1-hexene, 4-methyl-1-pentene, and 1-octene are especially preferred monomers for use with ethylene due to ease of copolymerization and best resultant copolymer properties. In this disclosure, the phrase, "ethylene polymer" includes homopolymers, as well as copolymers of ethylene.

Any catalyst suitable for polymerization of monomers to said polyolefin that can be deactivated can be utilized in this invention. Preferably, said catalyst is selected from Ziegler-Natta catalysts, Phillips catalysts, and metallocene catalysts, wherein said catalysts comprise transition metals of Groups IVB-VIII of the Periodic Table of the Elements. Most preferably, said transition metal is selected from the group comprising titanium, vanadium, chromium, and zirconium. Catalysts utilized to polymerize monomers to produce said polyolefin are described in U.S. Pat. Nos. 4,151,122, 4,296,001, 4,345,055, 4,364,842, 4,402,864, and 5,237,025, which are hereby incorporated by reference.

Said diluent is a compound in which the produced polyolefin is substantially, or entirely, insoluble. Suitable examples of diluents are isobutane, butane, propane, isopentane, hexane, and neohexane. Preferably, said diluent comprises isobutane, due to availability and ease of use.

In some cases, the diluent and the monomer utilized are the same chemical compound. For example, in a bulk polymerization to produce polypropylene, propylene is considered to be both the monomer and the diluent.

Stream 3 (flowing through Stream Zone 1 (200) in FIG. 1) comprises at least one polyolefin, at least one deactivated catalyst, at least one diluent, and at least one monomer. Said polyolefin and diluent were described previously in this disclosure. Said deactivated catalyst comprises at least one catalyst described previously, but said catalyst has been substantially deactivated by said deactivating agent. Said deactivated catalyst is substantially unable to polymerize monomers to produce said polyolefin under the polymerization conditions in Mixing Zone One (100).

Said Mixing Zone One (100) can be any reactor that can perform a slurry polymerization. However, it is preferred that said Mixing Zone One (100) is a loop reactor or a stirred tank reactor. Preferably, said Mixing Zone One (100) comprises a loop reactor, as described in U.S. Pat. Nos. 4,121,029 and 4,424,341, which are hereby incorporated by reference. Generally, in said loop reactor, at least one catalyst, at least one diluent, and at least one monomer are added continuously to and are moved continuously through said loop reactor. The monomers polymerize and form particulates, and said particulates are suspended in said polymerization reaction mixture.

The temperature in said Mixing Zone One (100) is such that substantially all of the polyolefin produced is insoluble in said diluent. The polymerization temperature depends on the diluent chosen and generally is in the range of about 30° C. to about 120° C. The temperature should be below about 120° C. to prevent the polyolefin from dissolving or melting in said diluent. In ethylene polymer production, the temperature should be in the range of about 65° C. to about 110° C. in order to more efficiently produce ethylene polymer.

The pressure employed in said Mixing Zone One (100) is that which is sufficient to maintain the diluent substantially in the liquid phase. Normally, said pressure ranges from about 100 psia to about 2000 psia. In ethylene polymer production, said pressure in said Mixing Zone One (100) ranges from about 500 psia to about 700 psia, in order to optimally produce ethylene polymer.

Step 2 is transporting at least a portion of Stream 3 from said Mixing Zone One (100) through a Stream Zone 1 (200) and to a Separating Zone One (300).

Stream Zone 1 (200) connects, in fluid-flow communication, said Mixing Zone One (100) with said Separating Zone One (300).

A portion of Stream 3 is transported from said Mixing Zone One (100) by any means known in the art. For example, said portion of Stream 3 can be transported from said Mixing Zone One (100) either continuously or intermittently by the use of takeoff lines. U.S. Pat. No. 4,613,484 discloses takeoff lines and is hereby incorporated by reference.

Step 3 is separating Stream 3 in said Separating Zone One (300) into Stream 4 and Stream 5. Stream 4 will flow out of Separating Zone One (300) through Stream Zone 2 (400) and Stream 5 will flow through Stream Zone 3 (500).

Said Stream 4 comprises a polyolefin lean stream wherein the majority of said Stream 4 comprises at least one diluent. Stream 4 can also further comprise at least one monomer. Said Stream 5 comprises a polyolefin rich stream wherein the majority of said Stream 5 comprises at least one polyolefin. Stream 5 can also further comprise at least one monomer and at least one diluent. Said diluent, monomer, and polyolefin were previously discussed in this disclosure.

Said Separating Zone One (300) can be any type of means to separate Stream 3 into Stream 4 and Stream 5. Generally, said Separating Zone One (300) comprises at least one separator, such as a cyclone or large vessel allowing solid polyolefins to collect or flow out the bottom and diluent and monomer vapors to flow out the top. Such a separator is sometimes referred to as a "flash chamber." Single or sequential flash chambers can be employed in this invention. The pressure in said flash chambers ranges from about 25 psia to about 400 psia. Flash chambers are disclosed in U.S. Pat. No. 3,152,872, which is hereby incorporated by reference.

Step 4 is transporting Stream 5 from said Separating Zone One (300) through a Stream Zone 3 (500) to an Agglomerating Zone One (600).

Stream Zone 3 (500) connects, in fluid-flow communication, said Separating Zone One (300) with said Agglomerating Zone One (600).

Step 5 is agglomerating Stream 5 in said Agglomerating Zone One (600) to produce a Stream 6, wherein Stream 6 comprises at least one agglomerated polyolefin.

Agglomerating Stream 5 can be accomplished by any methods known in the art depending upon the polyolefin being agglomerated. For example, extruders can be utilized to agglomerate Stream 5. The design of said extruders varies depending on the type of polyolefin being agglomerated. Said extruder can be, for example, a single screw extruder, multiscrew extruder, rotary extruder, or ram extruder. Further information on agglomeration of said polyolefin can be found in the PLASTICS ENGINEERING HANDBOOK OF THE SOCIETY OF THE PLASTICS INDUSTRY, 1991, pages 79–132.

Other components can also be blended with Stream 5 prior to or during agglomeration. For example, antifogging agents, antimicrobial agents, coupling agents, flame retardants, forming agents, fragrances, lubricants, mold release agents, organic peroxides, smoke suppressants, and heat stabilizers. Further information on these compounds can be found in MODERN PLASTICS ENCYCLOPEDIA, 1992, pages 143–198.

Step 6 is transporting Stream 6 from said Agglomerating Zone One (600) through a Stream Zone 4 (700) to a Product Recovery Zone (not depicted).

Stream Zone 4 (700) connects, in fluid-flow communication, said Agglomerating Zone One (600) with said Product Recovery Zone (not depicted). Said Product Recovery Zone can comprise downstream equipment placed after the extruder.

Figure 2:
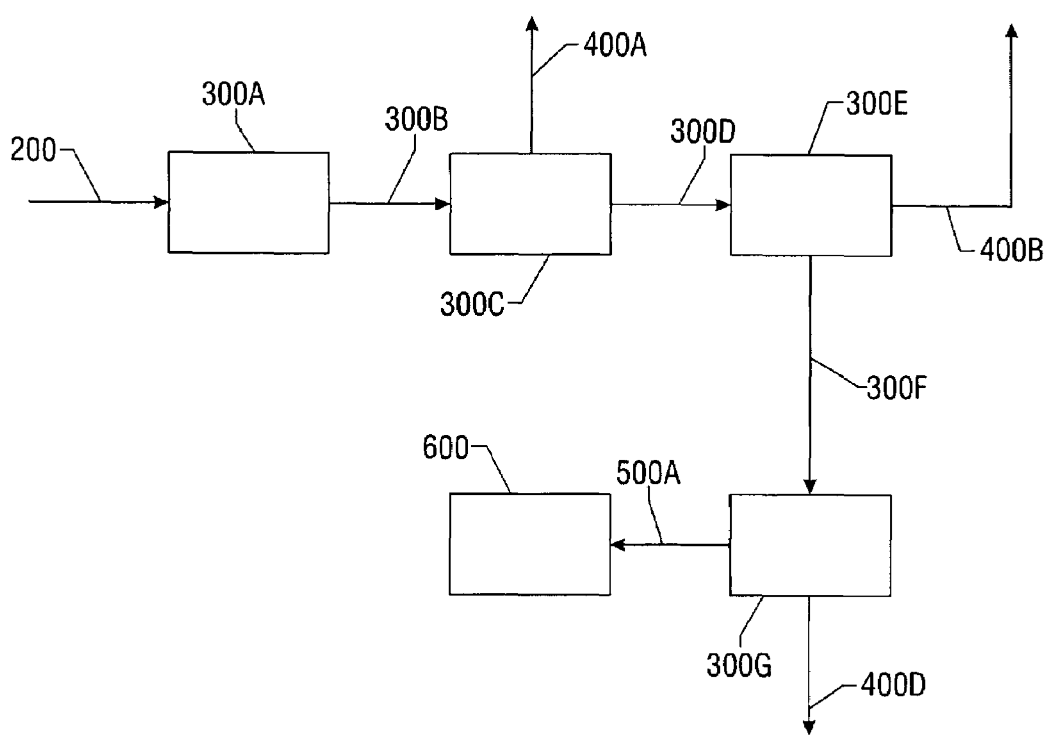
FIG. 2 discloses a diagram of a preferred embodiment of Separating Zone One (300).

A preferred embodiment of said Separating Zone One (300) comprises a Heating Zone One (300A), a High Pressure Zone (300C), a Low Pressure Zone (300E), and a Purge Zone One (300G) as depicted in FIG. 2. The separation in said Separating Zone One comprises the following process steps:

(3.1) heating Stream 3 in Heating Zone One (300A) producing Stream 3A;

(3.2) transporting stream 3A from said Heating Zone One (300A) through Stream Zone 1A (300B) to a High Pressure Separating Zone (300C);

(3.3) separating Stream 3A in said High Pressure Separating Zone (300C) to produce Stream 4A and Stream 5A;

wherein said Stream 4A comprises a polyolefin lean stream wherein the majority of said Stream 4A comprises at least one diluent;

wherein said Stream 5A comprises a polyolefin rich stream wherein the majority of said Stream 5A comprises at least one polyolefin;

(3.4) transporting Stream 5A from said High Pressure Separating Zone (300C) through Stream Zone 1B (300D) to a Low Pressure Separating Zone (300E) (optionally, the low pressure separating zone can be combined with a purge zone);

(3.5) separating Stream 5A in said Low Pressure Separating Zone (300E) to produce Stream 4B and Stream 5B;

wherein said Stream 4B comprises a polyolefin lean stream wherein the majority of said Stream 4B comprises at least one diluent;

wherein said Stream 5B comprises a polyolefin rich stream wherein the majority of said Stream 5B comprises at least one polyolefin;

(3.6) transporting Stream 5B from said Low Pressure Separating Zone (300E) through Stream Zone 1C (300F) to a Purge Zone One (300G);

(3.7) purging Stream 5B in said Purge Zone One (300G) with a gas to separate Stream 5B into Stream 4D and Stream 5C;

wherein said Stream 4D comprises a polyolefin lean stream wherein the majority of said Stream 4D comprises said gas and at least one diluent;

wherein said Stream 5C comprises a polyolefin rich stream wherein the majority of said Stream 5C comprises at least one polyolefin;

(3.8) transporting Stream 5C from said Purge Zone One (300G) through a Stream Zone 3A (500A) to an Agglomerating Zone One (600, as depicted in FIG. 1).

Step 3.1 in said Separating Zone One (300) is heating Stream 3 in said Heating Zone One (300A) producing Stream 3A. Heating Zone One (300A) comprises any means to heat Stream 3. Generally, said Heating Zone One (300A) comprises a flash line heater. The term "flash line heater" as used herein refers to a conduit, the interior of which is heated. Typically, most flash line heaters are double pipe heat exchangers. At least one diluent in Stream 3 is vaporized in an inner pipe utilizing the heat supplied from condensing steam in an annulus between an inner and outer pipe. U.S. Pat. Nos. 4,424,431 and 5,183,866 disclose flash line heaters, and are hereby incorporated by reference.

The exact heating conditions employed in said flash line heater will vary depending on the particular results desired and the particular polyolefin and diluent being processed. Generally, it is preferred to operate the flash line heater under conditions such that substantially all of said diluent in Stream 3 is vaporized over the time Stream 3 reaches the High Pressure Zone (300C). In ethylene polymer production, said flash line heater is at a temperature of about 30° C. to about 120° C., since this temperature range will allow most diluents to vaporize. A temperature above 120° C. can melt ethylene polymer, which can cause plugging of equipment. Preferably, in ethylene polymer processes, said flash line heater is at a temperature ranging from about 40° C. to about 100° C., since this temperature range is high enough to vaporize said diluent, but not too high to require a very long flash line heater which can increase construction and operational costs.

Generally, said flash line heater should operate at a pressure in the range of about 25 psia to about 400 psia since this pressure allows for efficient evaporation of said diluent. Preferably, for ethylene polymer processes, said flash line heater should operate within the range of about 135 psia to about 250 psia. When said flash line heater is operated in this range, said diluent can be condensed utilizing cooling water.

Stream 3A comprises at least one polyolefin and at least one diluent, wherein said diluent is in substantially a vapor phase.

Step 3.2 is transporting Stream 3A from said Heating Zone One (300A) through Stream Zone 1A (300B) to a High Pressure Separating Zone (300C). Stream Zone 1A (300B) connects, in fluid-flow communication, said Heating Zone One (300A) with said High Pressure Separating Zone One (300C).

Step 3.3 is separating Stream 3A in said High Pressure Separating Zone (300C) to produce Stream 4A and Stream 5A. Said High Pressure Separating Zone (300C) comprises any means to separate Stream 3A. Generally, said High Pressure Separating Zone comprises a high pressure flash chamber. By utilizing a high pressure flash chamber, Stream 4A can be recycled without the need for compression prior to reuse. This lowers the capital cost of equipment when polyolefin plants are constructed.

The conditions maintained in said high pressure flash chamber can vary widely depending upon the results desired, the polyolefin being employed, and the diluent involved. Said high pressure flash chamber should operate at a temperature and pressure to allow separation of Stream 3A into Stream 4A and Stream 5A. Said Stream 4A comprises a polyolefin lean stream wherein the majority of said Stream 4A comprises at least one diluent. Said Stream 5A comprises a polyolefin rich stream wherein the majority of said Stream 5A comprises at least one polyolefin. Preferably, said high pressure flash chamber should operate at a pressure in the range of about 50 psia to about 400 psia, in order to efficiently separate Stream 3A. Preferably, said high pressure flash chamber should operate within the range of about 135 psia to about 250 psia so that compression of Stream 4A is not required.

Step 3.4 is transporting Stream 5A from said High Pressure Separating Zone (300C) through Stream Zone 1B (300D) to a Low Pressure Separating Zone (300E).

Stream Zone 1B (300D) connects, in fluid-flow communication, said High Pressure Separating Zone (300C) with said Low Pressure Separating Zone (300E).

Step 3.5 is separating Stream 5A in said Low Pressure Separating Zone (300E) to produce Stream 4B and Stream 5B. Said Stream 4B comprises a polyolefin lean stream wherein the majority of said Stream 4B comprises at least one diluent. Said Stream 5B comprises a polyolefin rich stream wherein the majority of said Stream 5B comprises at least one polyolefin.

Said Low Pressure Separating Zone (300E) comprises any means to separate Stream 5A. Generally, said Low Pressure Separating Zone (300E) comprises a low pressure flash chamber. Typically, said low pressure flash chamber should operate at a pressure in the range of about 0 psia to about 50 psia, preferably, within the range of about 2 psia to about 20 psia, in order to allow more efficient separation of said diluent and said monomer.

Step 3.6 is transporting Stream 5B from said Low Pressure Separating Zone (300E) through Stream Zone 1C (300F) to a Purge Zone One (300G).

Stream Zone 1C (300F) connects, in fluid-flow communication, said Low Pressure Separating Zone (300E) and said Purge Zone One (300G).

Step 3.7 is purging Stream 5B in said Purge Zone One (300G) with a gas to separate Stream 5B into Stream 4D and Stream 5C.

Purge Zone One (300G) comprises any means to separate Stream 5B. Generally, said Purge Zone One (300G) comprises a purge column utilized to separate Stream 5B into Stream 4D and Stream 5C. Said Stream 4D comprises a polyolefin lean stream wherein the majority of said Stream 4D comprises said gas and at least one diluent. Stream 4D can also further comprise at least one monomer. Said Stream 5C comprises a polyolefin rich stream wherein the majority of said Stream 5C comprises at least one polyolefin. Stream 5C can also further comprise at least one monomer and at least one diluent. Said diluent, monomer, and polyolefin were previously discussed in this disclosure.

A gas is utilized to remove said diluent and said monomer. It is preferable when said gas does not react with said monomer, diluent, or polyolefin. Preferably, said gas comprises nitrogen, due to availability and ease of use. The purge rate of said gas is that which will substantially separate said diluent and said monomer from said polyolefin.

Generally, said purge column is operated at a temperature sufficient to separate Stream 5B. For ethylene polymer processes, said purge column is operated at a temperature in the range of about 30° C. to about 120° C. A temperature greater then 120° C. can cause the ethylene polymer to melt, therefore causing plugging of the equipment.

Generally, said purge column is operated at a pressure in the range of about 0 psia to about 400 psia. Preferably, said purge column is operated at a pressure in the range of about 0 psia to about 5 psia, in order to facilitate remove of said diluent and said monomer.

Optionally, said purge column can be utilized to store polyolefin when downstream equipment is not operational.

Step 3.8 is transporting Stream 5C from said Purge Zone One (300G) through a Stream Zone 3A (500A) to an Agglomerating Zone One (600). Stream Zone 3A (500A) connects, in fluid-flow communication, said Purge Zone One (300G) with Agglomerating Zone One (600, as depicted in FIG. 1).

Figure 3:
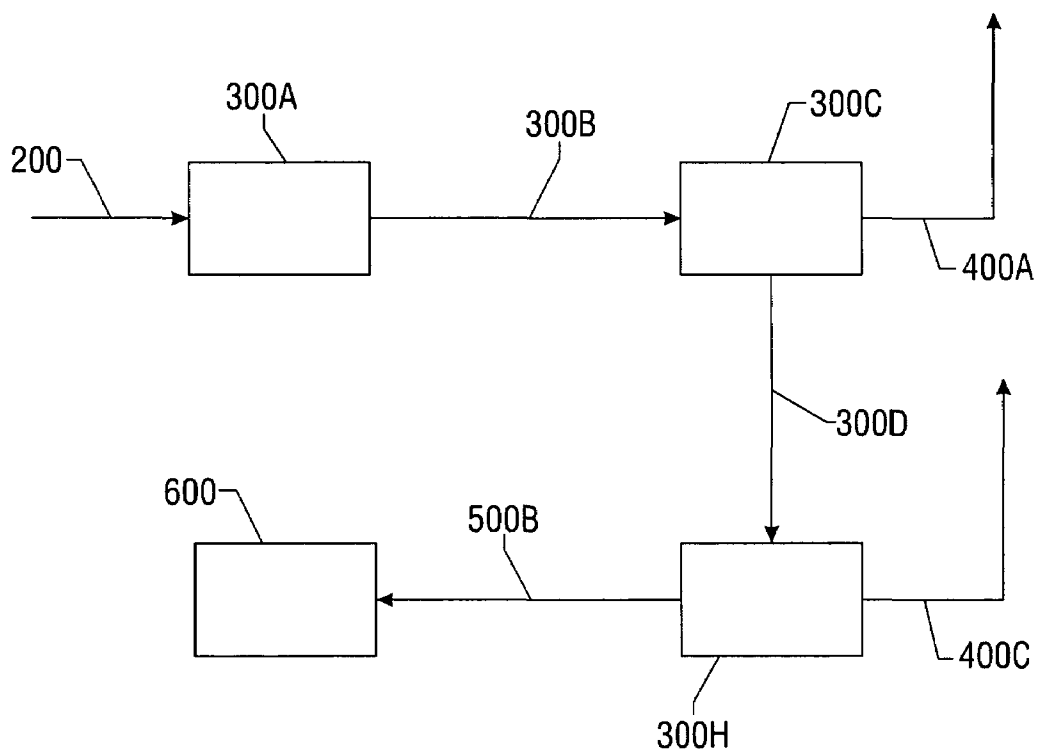
FIG. 3 discloses a diagram of a more preferred embodiment of Separating Zone One (300).

A more preferred embodiment of said First Separating Zone comprises a Heating Zone One (300A), a High Pressure Separating Zone (300C), and a Purge Zone Two (300H) as depicted in FIG. 3. The separation in said Separating Zone One comprises the following process steps:

(3.1) heating Stream 3 in Heating Zone One (300A) producing Stream 3A;

(3.2) transporting Stream 3A from said Heating Zone One (300A) through Stream Zone 1A (300B) to a High Pressure Separating Zone (300C);

(3.3) separating Stream 3A in said High Pressure Separating Zone (300C) to produce Stream 4A and Stream 5A;

- wherein said Stream 4A comprises a polyolefin lean stream wherein the majority of said Stream 4A comprises at least one diluent;
- wherein said Stream 5A comprises a polyolefin rich stream wherein the majority of said Stream 5A comprises at least one polyolefin;

(3.9) transporting Stream 5A from said High Pressure Separating Zone (300C) through Stream Zone 1B (300D) to a Purge Zone Two (300H);

(3.10) purging Stream 5A in said Purge Zone Two (300H) with a gas to separate Stream 5A into Stream 4C and Stream 5D;

- wherein said Stream 4C comprises a polyolefin lean stream wherein the majority of said Stream 4C comprises said gas and at least one diluent;
- wherein said Stream 5D comprises a polyolefin rich stream wherein the majority of said Stream 5D comprises at least one polyolefin;

(3.11) transporting Stream 5D from said Purge Zone Two (300H) through a Stream Zone 3B (500B) to an Agglomerating Zone One (600, as depicted in FIG. 1).

Steps 3.1, 3.2, and 3.3 have been previously described.

Step 3.9 is transporting Stream 5A from said High Pressure Separating Zone (300C) through Stream Zone 1B (300D) to a Purge Zone Two (300H). Stream Zone 1B (300D) connects in fluid flow communication said High Pressure Separating Zone (300C) and said Purge Zone Two (300H).

Step 3.10 is purging Stream 5A in said Purge Zone Two (300H) with a gas to separate Stream 5A into Stream 4C and Stream 5D.

Purge Zone Two (300H) comprises any means to separate Stream 5A. Generally, said Purge Zone Two (300H) comprises a purge column utilized to separate Stream 5A into Stream 4C and Stream 5D. Said purge column was previously discussed in this disclosure. Said Stream 4C comprises a polyolefin lean stream wherein the majority of said Stream 4C comprises said gas and at least one diluent. Stream 4C can also further comprise at least one monomer. Said Stream 5D comprises a polyolefin rich stream wherein the majority of said Stream 5D comprises at least one polyolefin. Stream 5D can also further comprise at least one monomer and at least one diluent. Said diluent, monomer, and polyolefin were previously discussed in this disclosure.

Step 3.11 is transporting Stream 5D from said Purge Zone Two (300H) through a Stream Zone 3B (500B) to an Agglomerating Zone One (600, as depicted in FIG. 1). Stream Zone 3B (500B) connects, in fluid-flow communication, said Purge Zone Two (300H) with Agglomerating Zone One (600, as depicted in FIG. 1).

In this more preferred embodiment, the Low Pressure Separating Zone (300E, as depicted in FIG. 2) has been eliminated. Adequate separation of said diluent and said monomer from said polyolefin is achieved in said High Pressure Separating Zone (300C) and said Purge Zone Two (300H). This embodiment is preferred since the capital cost of construction can be decreased since Low Pressure Separating Zone (300E, as depicted in FIG. 2) equipment is not required.

Optionally, said Separation Zone One (300) can also further comprise an Alternate Separating Zone (900), wherein Stream 3 can be diverted when said Separating Zone One (300) is not operational or when Stream 3 does not meet quality specifications. The Alternate Separating Zone is depicted in FIG. 1.

Said Alternate Separating Zone (900) comprises the following process steps:

(3.12) transporting at least a portion of Stream 3 from said Mixing Zone One (100) through Stream Zone 5 (800) to said Alternate Separating Zone (900);

(3.13) separating Stream 3 in said Alternate Separating Zone (900) into Stream 7, Stream 8, and Stream 9;

wherein Stream 7 comprises a polyolefin lean stream wherein a majority of said Stream 7 comprises at least one diluent;

wherein Stream 8 comprises a polyolefin rich stream wherein a majority of said Stream 8 comprises at least one polyolefin not suitable for agglomerating; and wherein Stream 9 comprises a polyolefin rich stream wherein a majority of said Stream 9 comprises at least one polyolefin suitable for agglomerating;

(3.14) transporting Stream 9 from said Alternate Separating Zone (900) through Stream Zone 8 (1200) to said Agglomerating Zone One (600).

Step 3.12 in said Alternate Separating Zone (900) is transporting at least a portion of Stream 3 from said Mixing Zone One (100) through Stream Zone 5 (800) to said Alternate Separating Zone (900). Optionally, reactor product can be transported to the Alternate Separating Zone (900) with only a short cross over spool diverting flow from 300 to 900. Said Stream Zone 5 (800) connects, in fluid-flow communication, said Mixing Zone One (100) and Alternate Separating Zone (900).

A portion of Stream 3 is transported from said Mixing Zone One (100) by any means known in the art. For example, said portion of Stream 3 can be transported from said Mixing Zone One (100) either continuously or intermittently by the use of takeoff lines as previously discussed.

Step 3.13 in said Alternate Separating Zone (900) is separating Stream 3 in said Alternate Separating Zone (900) into Stream 7, Stream 8, and Stream 9. Said Alternate Separating Zone can be any type of means to separate said Stream 3 into Stream 7, Stream 8, and Stream 9. Generally, said Alternate Separating Zone (900) comprises at least one alternate flash chamber. Generally, said Alternate Separating Zone (900) is operated at a pressure in the range of about 0 psia to about 400 psia. Preferably, said Alternative Separating Zone is operated at a pressure in the range of about 0 psia to about 30 psia, in order to efficiently separate said Stream 3.

Stream 7 comprises a polyolefin lean stream wherein the majority of said Stream 7 comprises at least one diluent. Said Stream 7 can be recycled to said Mixing Zone One (100).

Stream 8 comprises a polyolefin rich stream wherein a majority of said Stream 8 comprises at least one polyolefin not suitable for agglomerating. Generally, Stream 8 has a melt flow index greater than 50 times the melt flow index of Stream 5 as measured in accordance with ASTM D 1238-86, Procedure B—Automatically Timed Flow Rate Procedure, Condition 316/5.0 modified to use a 5 minute preheat time.

Stream 9 comprises a polyolefin rich stream wherein a majority of said Stream 9 comprises at least one polyolefin suitable for agglomerating. Generally, Stream 9 has a melt flow index less than 50 times the melt flow index of Stream 5. Preferably, Stream 9 has a melt flow index less than about 5 to about 10 times the melt flow index of Stream 5. Most preferably, Stream 9 has a melt flow index less than about 2 to about 4 times the melt flow index of Stream 5.

Generally, said Alternate Separating Zone (900) is operated at the same temperature as said Separating Zone One (300) as previously discussed.

Since the Alternate Separating Zone (900) can be utilized for said polyolefin that does not meet quality specifications, said Alternate Separating Zone (900) should provide a means for transporting both said polyolefin suitable for agglomeration and polyolefin not suitable for agglomeration. Stream 8 is transported through Stream Zone 7 (1100) to a Waste Container Zone (not depicted). Stream Zone 7 (1100) connects, in fluid-flow communication, said Alternate Separating Zone (900) to a Waste Container Zone (not depicted). Generally, a valve is provided located near the, bottom of said Alternate Separating Zone (900) to allow said polyolefin not suitable for agglomeration to be dumped to said Waste Container Zone (not depicted).

Step 3.14 is transporting Stream 9 from said Alternate Separating Zone (900) through Stream Zone 8 (1200) to said Agglomerating Zone One (600). Stream Zone 8 connects, in fluid-flow communication, said Alternate Separating Zone (900) and said Agglomerating Zone One (600).

One embodiment of the invention is a process for producing polyolefins. This process comprises introducing at least one monomer, at least one catalyst, and at least one diluent into an olefin polymerization zone under polymerization conditions. In normal operations, the at least one monomer is polymerized in that zone to form at least one polyolefin. The olefin polymerization zone comprises a slurry polymerization reactor that is a loop reactor or a stirred tank reactor. When there is a need to halt or moderate production of polyolefin, for example if an equipment problem occurs downstream of the reactor, a catalyst deactivating agent is temporarily introduced (i.e., for a limited period of time) into the olefin polymerization zone. The amount of catalyst deactivating agent introduced is effective to substantially deactivate some or all of the catalyst present in the reactor. As a result, polymerization of monomer is either substantially stopped or its rate is substantially slowed. "Substantially stopped" means that the polymerization reaction is either entirely halted, or that it continues to proceed at a rate that is only a small fraction (e.g., less than about 5% on a product weight basis) of its rate during normal operations. "Substantially slowed" means that the rate of polymerization is reduced by at least 50%. After any necessary equipment repairs or other adjustments are made, polymerization can be restarted (i.e., the rate of polymerization can be raised to the desired value) by introducing at least one catalyst, and optionally additional monomer and diluent, into the olefin polymerization zone. This allows polyolefin production to resume.

The process can optionally also include determination of the quantity of catalyst in the olefin polymerization zone. "Determination" in this context means that the quantity of catalyst that is present, and thus needs to be deactivated, is measured or estimated. For example, the quantity of catalyst present can be determined by measuring the quantity of reaction mixture in the reactor and analyzing the catalyst content of that mixture. As another example, the volume of reaction mixture can be estimated using a level gauge on the reactor, and the catalyst content of the mixture can be estimated from process experience. In embodiments of the invention in which it is desired to temporarily kill the polymerization, based on that determination of catalyst amount, at least approximately, an amount of catalyst deactivating agent is introduced into the reactor that is sufficient to substantially deactivate the catalyst (i.e., to substantially stop polymerization) but is not more than 125% of the amount required to substantially deactivate the catalyst. In particular embodiments of this process, the amount of catalyst deactivating agent introduced is not more than 110% of the amount required to substantially deactivate the catalyst, or not more than 105% of the amount required to substantially deactivate the catalyst.

This step of determining the amount of catalyst present can also be used in embodiments of the invention in which polymerization will only be moderated (i.e., the reaction rate reduced rather than killed).

The process can also comprise withdrawing an effluent from the polyolefin polymerization zone, and introducing the effluent into a separation zone. In the separation zone, the effluent is separated into a polyolefin lean stream, which usually comprises mostly diluent, and a polyolefin rich stream. The polyolefin rich stream is passed on to an agglomerating zone, in which polyolefin is agglomerated. In certain embodiments of the process, the polyolefin rich stream is passed directly to the agglomerating zone, without first passing through a storage zone. In other words, there is no need for a storage bin between the separation zone and the agglomerating zone. In one particular embodiment, the agglomerating zone comprises an extruder, and polyolefin is extruded in the agglomerating zone.

Another embodiment of the invention is olefin polymerization apparatus. The apparatus comprises a slurry polymerization reactor that is a loop reactor or a stirred tank. The reactor can comprise a Mixing Zone One (100) as shown in FIG. 1. The reactor is suitable for polymerizing at least one monomer in the presence of at least one catalyst and at least one diluent to form at least one polyolefin. In addition, the reactor comprises at least one effluent removal conduit, such as Stream Zone One (200) in FIG. 1, for removing an effluent that comprises at least one polyolefin. The apparatus also comprises a supply of catalyst deactivating agent operatively connected to the reactor (see Stream 1 (80) in FIG. 1) so that catalyst deactivating agent can be introduced into the reactor at selected times and in selected quantities. This supply will typically be in some type of process vessel, with flow control means such as valves to permit the introduction of the catalyst deactivating agent at selected times and in selected quantities.

Figure 4:
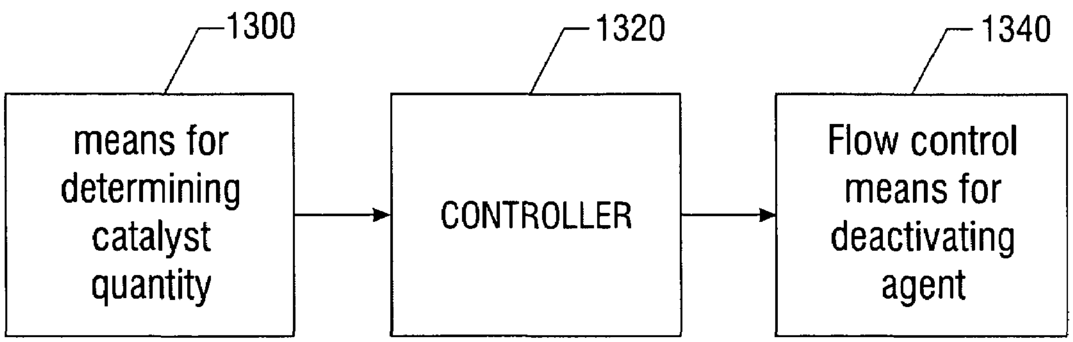
FIG. 4 is a process flow diagram showing a system in accordance with the present invention for determining the amount of catalyst deactivating agent to be introduced.

The apparatus also includes means for determining the quantity of catalyst in the reactor. These means can comprise level gauges, analytical equipment, calculation, or some combination of these or other instruments known in the field. As shown in FIG. 4, the quantity of catalyst determined to be in the reactor by use of the determining means (1300) can be used as the basis for selecting the quantity of catalyst deactivating agent to introduce. Therefore, the apparatus can further comprise means (1320) for determining the quantity of catalyst deactivating agent needed to substantially stop polymerization in the reactor, or to reduce the polymerization rate as desired. These means (1320) can range from computer-based controllers to approximate calculations by plant operators, or some combination of any of these or other techniques known in the field. This in turn can be used to operate flow control means (1340), such as automatic or manual valves that control the flow of catalyst deactivating agent into the reactor, optionally in combination with a flowmeter to measure the amount of agent added.

As an example, a reservoir of catalyst deactivating agent can be connected by a flow conduit to a sight glass, in which the desired quantity of deactivating agent can be measured. That quantity of deactivating agent can then be forced into the reactor by opening a valve that separates the sight glass from the reactor, and applying high pressure gas (e.g., nitrogen) to the deactivating agent in the sight glass.

The apparatus also includes a separation zone that is operatively connected to the effluent removal conduit, such as Separating Zone One (300) in FIG. 1. This separation zone is capable of separating the effluent into a polyolefin lean stream and a polyolefin rich stream, and comprises at least one polyolefin rich stream removal conduit, such as Stream Zone 3 (500) in FIG. 1. The apparatus also comprises an agglomerating zone operatively connected to the polyolefin rich stream removal conduit, such as Agglomerating Zone One (600) in FIG. 1. The agglomerating zone is capable of agglomerating polyolefin from the polyolefin rich stream. In one embodiment of the apparatus, the separation zone and the agglomerating zone are directly connected without any intervening storage zones through which the polyolefin rich stream must pass before entering the agglomerating zone. In a particular embodiment, the agglomerating zone comprises an extruder, and polyolefin is extruded in the agglomerating zone.

The preceding description of specific embodiments of the present invention is not intended to be a complete list of every possible embodiment of the invention. Persons skilled in this field will recognize that modifications can be made to the specific embodiments described here that would be within the scope of the following claims.

What is claimed is:

1. A process comprising:

introducing at least one monomer, at least one catalyst, and at least one diluent into an olefin polymerization zone under polymerization conditions, wherein the at least one monomer is polymerized to form at least one polyolefin, and wherein the olefin polymerization zone comprises a slurry polymerization reactor that is a loop reactor or a stirred tank reactor;

withdrawing an effluent from the olefin polymerization zone, and introducing the effluent into a separation zone in which the effluent is separated into a polyolefin lean stream and a polyolefin rich stream;

passing the polyolefin rich stream to an agglomerating zone, in which polyolefin is agglomerated;

introducing at least one catalyst deactivating agent into the olefin polymerization zone for a selected time in an amount effective to substantially deactivate at least part of the at least one catalyst, whereby the polymerization of the at least one monomer is substantially stopped or the rate of polymerization is substantially slowed; and restarting polymerization by introducing into the olefin polymerization zone at least one catalyst.

2. The process of claim 1, wherein the polyolefin rich stream is passed directly to the agglomerating zone, without first passing through a storage zone.

3. The process of claim 1, wherein the agglomerating zone comprises an extruder, and polyolefin is extruded in the agglomerating zone.

4. A process comprising:

introducing at least one monomer, at least one catalyst, and isobutane into an olefin polymerization zone under polymerization conditions, wherein the at least one monomer is polymerized to form at least one polyolefin, and wherein the olefin polymerization zone comprises a slurry polymerization reactor that is a loop reactor or a stirred tank reactor;

introducing at least one catalyst deactivating agent into the olefin polymerization zone for a selected time in an amount effective to substantially deactivate at least part of the at least one catalyst, whereby the polymerization of the at least one monomer is substantially stopped or the rate of polymerization is substantially slowed; and restarting polymerization by introducing into the olefin polymerization zone at least one catalyst.

* * * * *

UNITED STATES PATENT AND TRADEMARK OFFICE

CERTIFICATE OF CORRECTION

PATENT NO. : 7,005,485 B2 Page 1 of 1
DATED : February 28, 2006
INVENTOR(S) : David H. Burns et al.

It is certified that error appears in the above-identified patent and that said Letters Patent is hereby corrected as shown below:

Title page,
Item [75], Inventor, delete "OR" and insert -- OK --; and insert -- Scott E. Kufeld , Houston, TX (US) --.

Signed and Sealed this

Second Day of May, 2006

JON W. DUDAS
*Director of the United States Patent and Trademark Office*